March 18, 1952    W. H. NOELTING ET AL    2,589,847

CASTER

Filed June 23, 1949

INVENTORS.
WILLIAM H. NOELTING,
JOHN A. SKUPAS,
BY Lockwood, Goldsmith & Galt,
ATTORNEYS.

Patented Mar. 18, 1952

2,589,847

UNITED STATES PATENT OFFICE 2,589,847

CASTER

William H. Noelting and John A. Skupas, Evansville, Ind., assignors to Faultless Caster Corporation, Evansville, Ind., a corporation Application June 23, 1949, Serial No. 100,838

2 Claims. (Cl. 16—21)

This invention relates to a canted caster wheel caster of the swivel creeper type.

The chief object of the present invention is to provide a canted caster wheel and swivably mount the same for rotation upon a vertical axis, as it were, the wheel being rotatably mounted upon an axis that is inclined to both the horizontal and the vertical.

One feature of the invention in addition to disposing the parts as aforesaid consists in disposing the wheel axis in offset relation to the swivel axis.

Another feature of the invention resides in the specific construction of the caster wheel and its immediate mounting.

Another feature of the invention resides in the angular support for the wheel in lieu of the customary yoke structure commonly employed in casters.

Other objects and features of the invention will be set forth more fully hereinafter.

The full nature of the invention will be understood from the accompanying drawings and the following description and claims:

In the drawings Fig. 1 is an elevational view of a canted swivel creeper type caster embodying the invention.

Fig. 2 is a sectional view taken on line 2—2 of Fig. 1 and in the direction of the arrows.

Fig. 3 is a modified form of canted caster wheel and its pivotal support.

Fig. 4 is an elevational view of a modified form of canted wheel caster, the modification being shown in central section.

Fig. 5 is a similar view, the modification being shown in central section.

Figs. 4 and 5 illustrate semi-permanent axle and stem connections with appropriate sockets.

Figs. 6 and 7 are views similar to Figs. 5 and 4, respectively, with wheel parts omitted, the axle and stem connections being of detachable type.

In Figs. 1 and 2 of the drawings, 10 indicates a supporting plate, strap, etc., which includes an aperture 11 therein adapted to take a member 12 having a head portion 13 and an opposed shoulder portion 14. Extending downwardly from the shoulder portion is the stem 15.

Bearing against the shoulder 14 is the plate portion 16 terminating in an arcuately sectioned race way or bearing portion 17, which herein is shown exteriorly bearing upon its upper face on the lower face of the base 18. Trapped by said groove portion 17 is the upper series of antifriction balls 18. These bear upon the horizontal portion 19 of the swivable support having the central aperture 20 which herein is larger than the stem 15.

Disposed therebetween and in the aperture is a spacing sleeve 21 which at its upper end bears on the under face of the portion 16 and at its lower end bears upon the upper face of the retainer 22 that is mounted upon said stem. This retainer 22 has an outwardly and upwardly directed arcuately sectioned ball trapping and retaining portion 23.

Disposed therein are the anti-friction balls 24 of the lower series or race and these balls bear upon the under face of the portion 19. The stem is enlarged laterally as at 25 or is otherwise suitably provided with an enlargement to retain the aforesaid in assembled relation.

Other suitable retaining means may comprise threading upon the stem 15, and a conical nut which may be castellated and have a cotter key disposed therein and through the threaded end of the stem 15. The result is a rigid ball race support of upper and lower series type which swivably supports upon a vertical axis the plate portion 19.

The latter portion at one side includes a single depending portion 26 and extending oppositely therefrom relative to the portion 19 and in biased relation thereto is the portion 27. This portion is apertured as at 28.

A stem or axle is supported in outboard relation, as it were, by said portion 27, the axle being enlarged at 29 and also at 30 and extending through the aperture 28, thus having rigid mounting with respect to the plate portion 27. The major portion comprises an extension 31 or axle upon which the wheel is mounted. Preferably the free end of the axle is enlarged laterally as at 32 to trap the wheel between that enlargement and the enlargement 29, and the axle 31 rotatably supports the wheel structure.

The wheel structure comprises a disc 33 which is centrally apertured at 34 and is dished inwardly as at 35 to form a pocket 36. The outer edge of this disc is turned arcuately as at 37 and the same is extended reversely, as it were, as at 38 to form in effect a substantially semi-circular sectioned periphery for the wheel.

As shown in Fig. 2, the wheel bears on the supporting surface at the portion 37 at an angle of approximately 45 degrees, and by virtue of the inclination of the wheel the portion 38 is in effect a return bend portion so that no cutting edge is exposed either at the top of the wheel, see Fig. 2, or at the bottom of the wheel, see the same figure.

Herein a hub structure is provided and the same includes an elongated sleeve portion 39 substantially coextensive with the axle 31. Herein this hub portion or sleeve includes a flange 40 which is nested within the wheel and forms a laterally enlarged bearing for portion 34 of the wheel.

The hub is extended as at 41 and the free end is turned outwardly as at 42 so that the portion 34 is trapped between the lateral enlargements 42 and 40. Thus the hub is rigidly associated with the wheel proper and, as shown, by virtue of the pocket 36 being provided, no part of the hub structure and no part of the axle structure projects beyond the plane or side face of the wheel.

The opposite end of the hub structure provides the face 43 and interposed between that face and the axle enlargement 29 is the hardened thrust washer 44. This takes the wheel thrust imposed upon the plate portion 27 and hence reduces wear to a minimum.

Since the two portions 19 and 27 are oppositely directed with respect to the portion 26, it will be readily apparent that each of the aforesaid swivel connections may be readily effected by assembling as described and then enlarging in the customary manner since there is no interference by virtue of this opposed offsetting.

Reference will now be had to Fig. 3 wherein like parts are similarly indicated and similar parts are similarly designated by the numerals of the 100 series similar to the numerals of the primary series. Thus in Fig. 3 the axle 31 is rigidly mounted by virtue of the enlargements 29 and 30 in the aperture 28 of the plate portion 27 of the support 26. Bearing against the shoulder 29 is the hardened thrust washer 44 as before. The wheel comprises the plate portion 33 indented as at 35 forming the inwardly offset anchor portion 34 and thus providing pocket 36.

The bearing surface is indicated at 37 and the return safety portion and reinforcement is indicated at 38. The stem 31 as before includes the enlarged end 32. It does not project beyond the plane of the wheel 33.

Herein the hub 139 provides the shoulder 140 near one end and the shoulder or face 143 at the opposite end. The latter engages the thrust washer 44 as before for the purpose described. Herein the extended end 141 of the hub 139 which is of a slightly lesser diameter than that of the hub is extended laterally as at 142 to trap between such portion 142 and the shoulder or face 140 of the hub 139 the said indented portion of the wheel so that here again the wheel is rigidly secured to the hub and here again the hub is rotatably supported upon the axle 31.

In Figs. 4 and 5 there is illustrated a semi-permanently associated embodiment of the invention. Herein the angle strap type yoke 219—226—227 is apertured at each end as at 220 and 228. In the former is rigidly secured inverted socket 221 having closed lower end 222. In the latter is rigidly secured inclined socket 231 with closed upper end 230.

In the upper socket 221 is disposed stem 215 with rounded end 225, reduced neck 226, flange 214, and threaded upper end 213 adapted for plate and like mounting. The socket 221 includes the indented annular portion 223 whereby the stem is semi-permanently secured in said socket.

In the lower biased socket 231 is disposed stem type axle 239 having rounded end 243, reduced neck 244, enlargement 240, neck 241, and enlargement 242, the three last mentioned rigidly connecting the said stem to the wheel 233. The socket includes annular indented portion 229 to semi-permanently secure the stem type axle to said socket.

Each of the foregoing stem structures can forcibly be disconnected by the use of appropriate tools. Hence this embodiment is designated as of semi-permanent connection character.

In Figs. 6 and 7a detachable type of connection is illustrated. Herein numerals of the three hundred series designate parts identical or similar to those illustrated in Figs. 4 and 5 and designated by similar numerals of the two hundred series.

Herein each socket does not include the annular indented portions. Also the annular channels of the stem and stem type axle herein mount split grip rings and which are normally biased to grip the smooth interiors of the sockets.

Hence the connections in this form of the invention are of detachable type. In each instance the rings grip the socket interior to prevent separation or drop-out when the load is removed. Obviously, the detachable and semi-permanent types of connections may be interchanged as desired or required.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a swiveling canted caster having a horizontal attachment plate; a substantially Z-shaped strap comprising one flat end portion substantially parallel to said plate and a second flat end portion integral with said first portion and being inclined relative thereto in offset relation therefrom at an angle of approximately 45 degrees, vertically disposed means rotatably connecting said first portion to said plate, an axle rigidly connected to said second portion at approximately right angles thereto, an elongated hub rotatably mounted on said axle and being substantially coextensive therewith, said hub having a peripheral groove adjacent its lower end, and a caster wheel mounted on said hub and comprising a disc having a curved periphery and a centrally apertured indented portion, the marginal edges defining said aperture being engaged within said groove.

2. In a swiveling canted caster having a horizontal attachment plate; a substantially Z-shaped strap comprising one flat end portion substantially parallel to said plate and a second flat end portion integral with said first portion and being inclined relative thereto in offset relation therefrom at an angle of approximately 45 degrees, vertically disposed means for rotatably connecting said first portion to said plate including a stem fixedly secured to said plate and extending through said first portion, a top ball race enveloping said stem and interposed between said plate and said first portion, a bottom ball race enveloping said stem adjacent the lower end thereof, balls interposed between said races and the opposing faces respectively of said first portion, said stem having a flange complementary to said bottom race formed at its lower end, said flange supporting said races, said balls and said first portion against vertical displacement, an axle rigidly connected to said second flat portion at approximately right angles thereto, an elongated hub rotatably mounted on said axle and being substantially coextensive therewith, said hub having a peripheral groove adjacent its lower end, and a caster wheel mounted on said hub and comprising a disc having a curved periphery and a centrally apertured indented portion, the marginal edges defining said aperture being engaged within said groove.

WILLIAM H. NOELTING.
JOHN A. SKUPAS.

REFERENCES CITED

The following references are of record in the file of this patent:

UNITED STATES PATENTS

| Number | Name | Date |
|---|---|---|
| 309,273 | Whitney | Dec. 16, 1884 |
| 574,017 | Blue | Dec. 29, 1896 |
| 1,421,647 | Wolfs | July 4, 1922 |
| 1,975,661 | Powell | Oct. 2, 1934 |
| 2,332,089 | Knight | Oct. 19, 1943 |
| 2,484,189 | Shepherd | Oct. 11, 1949 |

FOREIGN PATENTS

| Number | Country | Date |
|---|---|---|
| 4,745 | Great Britain | of 1893 |
| 17,466 | Great Britain | Nov. 16, 1905 |